US011698135B2

(12) United States Patent
Wilke et al.

(10) Patent No.: US 11,698,135 B2
(45) Date of Patent: Jul. 11, 2023

(54) SEAL ARRANGEMENT AND SEAL ELEMENT WITH A HIGH-PRESSURE SIDE FLUSHING FUNCTION

(71) Applicant: Trelleborg Sealing Solutions Germany GmbH, Stuttgart (DE)

(72) Inventors: Mandy Wilke, Böblingen (DE); Holger Jordan, Neuhausen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 419 days.

(21) Appl. No.: 16/536,117

(22) Filed: Aug. 8, 2019

(65) Prior Publication Data

US 2019/0360595 A1 Nov. 28, 2019

Related U.S. Application Data

(63) Continuation of application No. PCT/EP2018/053292, filed on Feb. 9, 2018.

(30) Foreign Application Priority Data

Feb. 17, 2017 (DE) .................... 10 2017 202 610.3

(51) Int. Cl.
*F16J 15/16* (2006.01)
*F16J 15/3224* (2016.01)
(Continued)

(52) U.S. Cl.
CPC ......... *F16J 15/164* (2013.01); *F16J 15/3224* (2013.01); *F16J 15/3244* (2013.01); *F16J 15/3404* (2013.01); *F16J 15/3452* (2013.01)

(58) Field of Classification Search
CPC .... F16J 15/164; F16J 15/3224; F16J 15/3244; F16J 15/3404; F16J 15/3452
See application file for complete search history.

(56) References Cited

U.S. PATENT DOCUMENTS 2,188,857 A * 1/1940 Chievitz .............. F16J 15/3244
277/559
3,497,225 A * 2/1970 Workman ................ F16J 15/32
134/67

(Continued)

FOREIGN PATENT DOCUMENTS

CN 102818030 A 12/2012
CN 103808451 A 5/2014
(Continued)

*Primary Examiner* — Vishal A Patel
(74) *Attorney, Agent, or Firm* — Orbit IP

(57) ABSTRACT

A seal arrangement includes a first and a second machine part which are arranged spaced apart from one another with the formation of a sealing gap and can be moved relative to one another about a movement axis. A seal element with a base section is arranged on or in a seal holding structure of one of the two machine parts. A sealing head bears in a dynamically sealing manner by way of a sealing section against a sealing surface of the respective other machine part in order to seal a high-pressure side from a low-pressure side. The seal element on the high-pressure side has at least one flow element, wherein during relative movement of the two machine parts fluid on the high-pressure side in the area of the sealing section of flows onto the sealing head.

15 Claims, 17 Drawing Sheets

(51) Int. Cl.
*F16J 15/3244* (2016.01)
*F16J 15/34* (2006.01)

(56) References Cited

U.S. PATENT DOCUMENTS

| | | | | | |
|---|---|---|---|---|---|
| 3,501,155 | A | * | 3/1970 | Dega | F16J 15/3244 |
| | | | | | 277/309 |
| 3,934,888 | A | * | 1/1976 | Lutz | F16J 15/3244 |
| | | | | | 277/568 |
| 4,344,631 | A | * | 8/1982 | Winn | B63H 23/321 |
| | | | | | 277/552 |
| 4,844,484 | A | * | 7/1989 | Antonini | F16J 15/3224 |
| | | | | | 277/561 |
| 5,511,886 | A | * | 4/1996 | Sink | B61F 15/22 |
| | | | | | 277/559 |
| 6,513,812 | B1 | * | 2/2003 | Yang | F16J 15/3264 |
| | | | | | 277/561 |
| 7,775,528 | B2 | * | 8/2010 | Berdichevsky | F16J 15/3244 |
| | | | | | 277/559 |
| 7,963,526 | B2 | * | 6/2011 | Dahlheimer | F16J 15/324 |
| | | | | | 277/564 |
| 2002/0081212 | A1 | * | 6/2002 | Yamada | F16J 15/3232 |
| | | | | | 417/222.2 |
| 2005/0098959 | A1 | * | 5/2005 | Uhrner | F16J 15/3244 |
| | | | | | 277/500 |
| 2008/0217865 | A1 | * | 9/2008 | Sedlar | F16J 15/3244 |
| | | | | | 277/572 |
| 2010/0109252 | A1 | * | 5/2010 | Matsui | F16J 15/324 |
| | | | | | 277/559 |
| 2016/0116065 | A1 | | 4/2016 | Putkowski | |
| 2016/0281855 | A1 | * | 9/2016 | Didwiszus | F16J 15/3204 |

FOREIGN PATENT DOCUMENTS

| | | |
|---|---|---|
| CN | 106039878 A | 10/2016 |
| DE | 23 51 066 C2 | 10/1975 |
| DE | 298 22 515 U1 | 7/1999 |
| EP | 1 561 773 A1 | 8/2005 |
| JP | 46-036124 | 10/1971 |
| JP | S56150670 A | 11/1981 |
| JP | 2004-251442 A | 9/2004 |
| JP | 2009-541666 A | 11/2009 |
| JP | 2010 014219 A | 1/2010 |
| JP | 2010-084802 A | 4/2010 |
| JP | 2010 014192 A | 10/2010 |
| WO | 2007 147391 A1 | 12/2007 |
| WO | 2014 161622 A2 | 10/2014 |

* cited by examiner

SEAL ARRANGEMENT AND SEAL ELEMENT WITH A HIGH-PRESSURE SIDE FLUSHING FUNCTION

CROSS-REFERENCE TO RELATED APPLICATIONS

This continuation application claims priority to PCT/EP2018/053292 filed on Feb. 9, 2018 which has published as WO 2018/149747 A1 and also the German application number 10 2017 202 610.3 filed on Feb. 17, 2017, the entire contents of which are fully incorporated herein with these references.

DESCRIPTION

Field of the Invention

The invention relates to a seal arrangement and a seal element-with a high-pressure side flushing function. The seal arrangement comprises first and second machine parts which are spaced apart from one another with the formation of a sealing gap and can be moved relative to one another about a movement axis. The seal arrangement comprises a seal element with a base section which is arranged on or in a seal holding structure, in particular in a holding groove, of one of the two machine parts. The seal element has a sealing head which bears in a dynamically sealing manner by way of a sealing section against a sealing surface of the respective other machine part in order to seal a high-pressure side of the sealing gap with respect to a low-pressure side of the sealing gap.

BACKGROUND OF THE INVENTION

Such dynamic seal systems constitute essential design elements in mechanical engineering as well as in the construction of vehicles. The seal elements are used, for example, as radial or axial shaft seals. At the same time, such seal elements are, in practice, exposed to ever-increasing operating pressures, temperatures, and sliding speeds, not least due to the technical development of the assemblies. The failure of seal elements results in an undesirable leakage of the fluid to be sealed, which may have devastating consequences, particularly in critical applications. The seal elements must therefore meet increasingly higher demands with respect to their sealing capacity and, at the same time, should also have an improved service life.

A reduction in the service life of the seal elements caused by friction is counteracted in practice primarily by optimized lubrication in the area of the sealing section of the seal element that comes in contact with the sealing surface, by using material pairings with preferably minimal sliding friction, as well as an optimized heat dissipation in the area of the sealing zone. In this regard, the attempt is also made to further improve the so-called drag-back capability of the seal elements. During operation of the seal arrangements, it is possible in the region of the sealing zone or the sealing section of the seal element coming in contact with the sealing surface that, when lubricating oil is used, a thermal overloading of the lubricating oil and, as a consequence, so-called carbon buildup can occur. This occurs especially when using seal elements made of an elastomeric material with a high temperature resistance. These include in particular the so-called fluoroelastomers, which have become established in modern sealing systems. It is known that two types of carbon buildup can be distinguished. Carbonized oil can settle directly on the seal or the sealing surface and accumulate there. If the accumulated carbon buildup exceeds a certain thickness, the service life of the seal element is shortened. In addition, lubricating oil can also penetrate the elastomer of the seal and lead to the carbon buildup here as well. This way, the seal element becomes less elastic in the region of its sealing section or its sealing edge. Finally, the seal element can no longer sufficiently compensate for vibrations of the machine parts or irregularities of the sealing surface, causing oil to escape. This second form of carbon buildup has a significant impact on the service life of the seal element.

It is therefore the object of the invention to provide an aforementioned seal arrangement and a seal element which better counteract the carbon buildup and the deposition of carbon on the seal element and its inclusion into the material of the seal element solutions that are currently available.

SUMMARY OF THE INVENTION

The object relating to the seal arrangement is achieved by a seal arrangement having the features specified in the independent claims.

The seal arrangement according to the invention is characterized essentially by the fact that the seal element is provided on the high-pressure side, in particular on its front side or on its side facing the high-pressure side, with at least one flow generator or one flow element through which, during a relative movement of the two machine parts, a fluid flow is effected in the sealing gap such that the sealing head on the high-pressure side is flowed onto in the region of its sealing section. Thus, during operation of the seal arrangement, the flow element directly or indirectly generates a flushing flow of the fluid arranged on the high-pressure side in the sealing gap in the direction of a dynamic sealing zone. The flow element generates a pressure difference in the fluid. As a result of this pressure difference, the fluid is accelerated either directly towards the dynamic sealing zone of the seal arrangement or away from the sealing zone. In the latter case, the fluid flowing toward the sealing zone flows onto the sealing zone. In the case of a rotational relative movement of the two machine parts, either the seal element rotates together with the machine part having the seal holding structure relative to the sealing surface, or the machine part having the sealing surface rotates relative to the seal element. In the latter case, the fluid is offset by its friction on the sealing surface and its inherent viscosity in a flow directed around the axis of rotation of the sealing surface (so-called Taylor Couette flow). If the machine part having the sealing surface—in relation to the movement axis of the two machine parts—is the machine part lying in the radial direction and is offset in rotation, then the fluid accelerated at the machine part having the sealing surface additionally pushes outward at higher rotational speeds due to the centrifugal force. This creates so-called Taylor vortices, which are perpendicular to the movement axis of the two machine parts and cause a mixing of the fluid. The sealing head has a convexly shaped end face in cross-section, which faces the sealing surface. The sealing head is therefore formed spherically on the sealing surface side. As a result, a high-pressure side fluid space is defined between the sealing head and the sealing surface, which tapers toward the sealing zone in its free cross-section, that is the section through which the fluid can flow. As a result, an overall improved flow control of the fluid flowing toward the sealing zone can be achieved for the cooling, lubrication, and flushing of the dynamic sealing zone. This is also advantageous for the removal of already existing carbon buildup in the sealing zone or to prevent the occurrence of such a buildup. The sealing section of the sealing head according to the invention comprises at least one tread, which extends away from the end face of the sealing head. This tread thus protrudes from the contour of the end face of the sealing head. The tread may have a rounded shape in the unloaded state, i.e., with a radius, or have sealing edges on both sides. According to the invention, the sealing strip is provided with a continuous, preferably macroscopically unstructured, tread.

In the case of a relative movement of the two machine parts around the movement axis, the fluid flows onto the flow element, and the flow element generates in the flow a flow which is, in the case of a radial seal element, in the axial direction and, in the case of an axial seal element, in the radial direction (in each case relative to the movement axis of the two machine parts), directed towards the sealing section of the sealing head or away from the sealing section. In the former case, the fluid that is directed by the flow element toward the sealing section of the seal element flows onto the sealing section or the sealing zone. In the latter case, the fluid flowing toward the sealing zone flows onto the sealing section or the sealing zone.

Overall, this allows a further improved lubrication and cooling, and, additionally, an active flushing in the region of the sealing section that is in contact with the sealing surface of the sealing head or the sealing zone can be achieved. The formation and buildup of carbon or deposition of carbon in the sealing section of the seal element can be effectively counteracted. The fluid may even be able to actively flush any already existing carbon buildup that is potentially deposited onto the sealing section of the seal element from the sealing zone.

According to the invention, the flow element may be formed in particular as a groove of the seal element. Such a groove can be produced simply and cost effectively in the original molding methods used in the manufacture of seals, in particular by way of injection molding. According to an alternative embodiment of the invention, the flow element can also be designed as a recessed passage (through bore) of the seal element or sealing head.

The aforementioned groove or the recessed passage (through bore) of the sealing head is preferably formed or arranged at least partially obliquely in the direction of movement of the two machine parts. According to the invention, the aforementioned groove or the recessed passage (through bore) is designed to be open at both ends.

For a particularly efficient flushing effect in the area of the sealing zone, the groove or the recessed passage (through bore) according to the invention can, at least in sections, taper in its cross section through which the fluid can flow from the high-pressure side in the direction of the low-pressure side or the sealing section of the sealing head. As a result, the groove can act in the sense of a nozzle and accelerate the fluid more effectively once again in the direction of the sealing section. Due to the groove, therefore, the fluid can be directed toward the sealing section at a high flow rate. Overall, the desired flushing effect of the fluid can be further improved in this manner so that carbon buildup that already exists can be detached even more effectively from the sealing section or the sealing surface and removed from the sealing area.

The groove or the recessed passage (through hole) of the sealing head are fluidly connected on the sealing section side by means of an annular flow channel, preferably in the form of an end-side circumferential groove; i.e., they open into this annular flow channel of the sealing head. As a result, the sealing section can be completely surrounded by the fluid on the high-pressure side in the circumferential direction. This is advantageous for the heat dissipation in the area of the sealing zone. This also achieves a further optimized flushing of the sealing zone. The annular flow channel (toward the low-pressure side) is advantageously delimited by the sealing section of the sealing head applied to the sealing surface sealing section in the lateral direction.

According to an alternative embodiment of the invention, the flow element of the sealing head extends away from the sealing head. The flow element is thus designed in the form of a profile extension of the sealing head. Under production engineering aspects, the flow element is therefore preferably formed directly on the sealing head. As a result, the flow element is held in place on the sealing head at the same time. The flow element acts in the manner of a blade (vane) for the sealing head. The flow element may have an oval, elliptical, polygonal, or triangular cross-sectional shape. A free-form cross-sectional shape in the sense of a wing profile is conceivable as well. The (thrust) effect of the flow element designed as a profile extension of the seal element can be adjusted as required by appropriate dimensioning and shaping of the surface(s) of the flow element that can be flowed onto by the fluid or that are flowed onto in operation. By making a suitable selection of the slope of the surface(s) of the flow element exposed to flow relative to the movement axis or relative to the local radius of the seal element and a potential inclination of the surface(s) of the flow element exposed to flow, the acceleration of the fluid can be influenced by the flow element. The flow element can also be formed so that it has a bidirectional effect, in particular in the case of rotationally movable machine parts; i.e., it can effect a flow that is directed along the sealing gap in both directions of movement of the machine parts relative to each other.

According to the invention, the flow element may be arranged circumferentially on the sealing head and/or at least in sections on a side flank of the sealing head.

The lubrication and cooling of the sealing section of the seal element can be further improved according to the invention in that the seal element is provided with a plurality of flow elements. As a result, the formation and deposition/inclusion of carbon at the sealing section of the seal element can be counteracted even more effectively at the same time. Thus, in particular one or more groove-shaped and/or one or more flow elements protruding from the seal element that are combined with each other may be arranged on the sealing head. The groove-shaped flow element(s) may, for example, be arranged on the end side of the sealing head facing the sealing surface, and the flow element(s) projecting from the sealing head may be arranged on a side flank of the seal element or the sealing head. In particular, by virtue of the flow elements projecting away from the sealing head, a mixing of the fluid, which is advantageous under thermal aspects, can be achieved at the same time. If turbulent flow areas within the fluid are created by the flow elements, larger particulate impurities (for example, coal agglomerates) can also be crushed and slurried in the fluid. The risk of damage to the sealing head or the sealing surface (scoring) can thus be minimized even further.

The plurality of flow elements may be arranged in the circumferential direction of the seal element on the sealing head in a single row or multiple rows. According to a particularly preferred embodiment, the flow elements can be consecutively arranged on the sealing head at least partially along a helical or spiral line. The seal elements arranged in this way can interact in a particularly effective manner. As a result, a functionally sufficient, large flow of fluid can be achieved even with compact dimensions of the individual flow elements on the high-pressure side of the seal element.

It should be noted that the seal element may have low-pressure side return elements, which are arranged on the sealing head. As a result, fluid that has passed from the high-pressure side to the low-pressure side can be conveyed back to the sealing section of the sealing head, thereby further improving the lubrication, cooling, and also the drag-back capability of the seal element. The return-conveying elements may be groove-shaped or also shaped as profile extensions in a manner corresponding to the aforementioned flow elements of the seal element.

According to the invention, the seal element may, at least partially, preferably completely, consist of an elastomeric material.

It should also be noted that the seal retaining structure may be formed by a cartridge so as to make the assembly of the seal arrangement even easier. The cartridge may be made of metal or another suitable material.

According to the invention, the sealing head and the base section can be connected to each other by means of an elastically deformable connecting section of the seal element which has a nonlinear, cross-sectional shape or a substantially nonlinear, cross-sectional shape and a plurality of material-weakened areas, spaced one behind the other in the circumferential direction of the seal element, preferably at regular intervals.

In the case that the seal element is formed—with respect to the movement axis of the two machine parts—in a radially sealing manner, i.e., as a so-called radial shaft seal or piston ring, the connecting section has a nonlinear, i.e. curved, cross-sectional profile in the radial direction. In the event that the seal element is formed so that it has an axially sealing function, i.e. as a so-called axial shaft seal, the connecting section accordingly has a nonlinear, i.e., curved, cross-sectional profile in the axial direction. By means of such a cross-sectional profile of the elastically, in particular rubber-elastically, deformable connecting section, vibrations of the machine part with the sealing surface as well as irregularities of the sealing surface can be reliably absorbed or compensated by means of the connecting section. As a result, a local overloading of the sealing section or the sealing edge of the sealing head can be avoided, and a reliable sealing capability of the seal element can be achieved. In addition, a particularly compact design of the seal element can be realized. This is advantageous for the possible range of use of the seal arrangement. If the connecting section forms a free space that is open towards the high-pressure side, then the seal element can be pressure activated by a high-pressure side pressurization of the seal arrangement. In other words, the sealing head is pressed against the sealing surface at a pressure proportional to an operating pressure prevailing on the high-pressure side. Advantageously, the connecting section has (at least in sections) a bow-shaped or meander-shaped, i.e., U- or V-shaped cross-sectional contour.

By providing the material-weakenings of the elastically, preferably rubber-elastically, deformable connecting section in the circumferential direction of the seal element, a particularly efficient lubrication and thus cooling of the sealing zone, i.e., the contact zone of the sealing section and the sealing surface, can be achieved. This counteracts the formation of carbon in the area of the dynamic sealing zone of the seal arrangement. The weakened material in the connection section provides the sealing head with lower torque support during operation of the seal arrangement than the non-material-weakened regions of the connection section. These are interposed in the material weaknesses in the circumferential direction of the seal element. During a relative movement of the two machine parts, a contact pressure curve of the sealing section on the sealing surface corresponding to the spatial distribution pattern of the areas with material weaknesses- and the areas without material weaknesses in the connecting section is thereby effected on the sealing surface in the circumferential direction. The changing or inconstant contact (surface) pressure of the sealing section of the sealing head in the circumferential direction of the seal element allows for an improved lubrication of the wear-prone sealing section by fluid arranged on the high-pressure side of the sealing gap and the seal arrangement. This does not negatively affect the sealing behavior of the seal element.

According to the invention, the connecting section may, either completely or partially, effect the prestressed sealing engagement of the sealing head on the sealing surface, which is critical for the sealing capability of the seal element. In both cases, therefore, the sealing head is pressed against the sealing surface by the connecting section, which is necessarily supported on the machine part containing the seal holding structure. In this case, the base section rests against the machine part containing the seal-holding structure in the axial or radial direction in a statically sealing manner. Due to the weakening of the material of the connecting section according to the invention, the inconstant/alternating contact pressure curve of the sealing section on the sealing surface corresponding to the spatial distribution pattern of the material-weakenings is further improved in both cases. The sealing section of the sealing head rests, with those sealing section (surface) areas that are aligned with the material-weakenings of the connecting section in a direction orthogonal to the sealing surface, on the sealing surface with a smaller contact (surface) pressure than on those areas which are aligned with the nonweakened areas of the connecting section in a direction orthogonal to the sealing surface. As a result, the self-lubrication of the seal arrangement in the area of the sealing zone, i.e., a sufficient lubricating layer in the area of the contact zone between the sealing head and the sealing surface, and thus the service life of the seal element, can be further improved.

The connecting section according to the invention in the material-weakened areas preferably has a thickness which is less than 90%, in particular less than 50%, of the maximum thickness of the connecting section. The areas with material weaknesses are therefore not recesses of the connecting section, but seal the high-pressure side against a passage of the fluid to the low-pressure side at all times. The connecting section may be integrally formed on the sealing head in the middle or, alternatively, on the edge, in particular on the low-pressure side edge of the sealing head. In the former case, therefore, the sealing head extends laterally away from the connecting section and, in the case of an axially sealing seal element, in the axial direction with respect to the movement axis, and in the radial direction on both sides. This way, the sealing section of the sealing head can, in an easy manner, be circumferentially pressed against the sealing surface in a direction that is orthogonal to the sealing surface. In both cases, space is created for further functional or add-on parts of the seal element.

Thus, the sealing head according to the invention may comprise at least one holding structure, in or on which a (rubber) elastically deformable preloading element, in particular a worm spring or an elastomeric ring, is arranged in a holding manner, by which the sealing head is clamped against the sealing surface. Such a preloading element may be provided according to the invention additionally or alternatively to a preloading of the healing head provided by the connecting section against the sealing surface. According to the invention, the holding structure is preferably arranged on the back side of the sealing head facing the base section. In terms of production engineering aspects as well as with regard to a simple and secure mounting of the seal element, the holding structure is advantageously designed as an annular groove. If the sealing head has only one such holding structure, it is advantageously positioned on the high-pressure side of the sealing head. As a result, an even more reliable sealing capability of the seal element can be ensured.

According to a preferred development of the invention, the sealing head has a holding structure, which is preferably located on its back side facing the base section, on both sides of the connecting section, i.e., on the low-pressure side and on the high-pressure side.

According to a first alternative embodiment of the invention, a (rubber) elastically deformable preloading element for the sealing head, in particular a worm spring or an elastomer ring, may be fixedly arranged in/on the two holding structures. By means of the preloading elements that are spaced apart, the sealing section of the sealing head can be pressed against the sealing surface in a particularly reliable and tilt-resistant manner.

According to a second alternative embodiment of the invention, a support ring may be arranged in/on the holding structure arranged on the low-pressure side and an elastically deformable preloading element, in particular a worm spring or an elastomer ring, may be arranged in/on the holding structure on the high-pressure side. The support ring is rigid in relation to the material of the seal element or the sealing head, i.e., dimensionally stable in the radial and axial directions. Due to the elastically deformable material of the sealing head, the support ring is able to secure the sealing head in its sealing position on the sealing surface. In view of the elastically deformable material of the sealing head, the support ring is furthermore able to perform the function of preloading element for the sealing head, if dimensioned accordingly. The support ring may also provide axial or radial support of the sealing head and/or act as the connecting section of the seal element at the low-pressure side, thus ensuring the operability of the seal element even at high operating pressures of the fluid. By means of the preloading element arranged on the high-pressure side, sufficient contact pressure of the sealing head against the sealing surface can be achieved when the seal arrangement is in use.

For a particularly simple and permanent attachment of the aforementioned preloading element(s) or the support ring, the annular groove according to the invention preferably has an opening cross section that is smaller than the inner diameter of the annular groove. When the seal arrangement is mounted, the aforementioned attachments can be easily clipped into the annular groove and captively secured to the seal element.

According to a development of the invention, the support ring can be provided, if necessary, with a wiping or sealing lip to counteract the entry of contaminants from the low-pressure side to the high-pressure side of the sealing gap. As a result, the seal arrangement is even better suited for use in highly polluted environments. The wiping or sealing lip is preferably peripherally attached to the machine part having the sealing surface. The wiping lip is particularly advantageous in machine parts that are movable with respect to each other in translation.

According to the invention, the sealing head can be realized with different cross-sectional shapes. Thus, the sealing head may have an oval, elliptical, or even polygonal cross-sectional shape. Preferably, the sealing head has an end face that is convexly shaped in cross section and that points toward the sealing surface. The sealing head is therefore formed spherically on the sealing surface side.

The seal element according to the invention allows for improved self-lubrication and self-cooling, and counteracts in operation the buildup of carbon as well as the accumulation or deposition thereof in its sealing section. In this manner, the seal element can reach a longer service life, particularly in high-speed applications.

BRIEF DESCRIPTION OF THE DRAWINGS

The invention will be explained in more detail on the basis of one embodiment shown in the drawings. The drawings show.

DETAILED DESCRIPTION OF THE PREFERRED EMBODIMENTS

Figure 1:
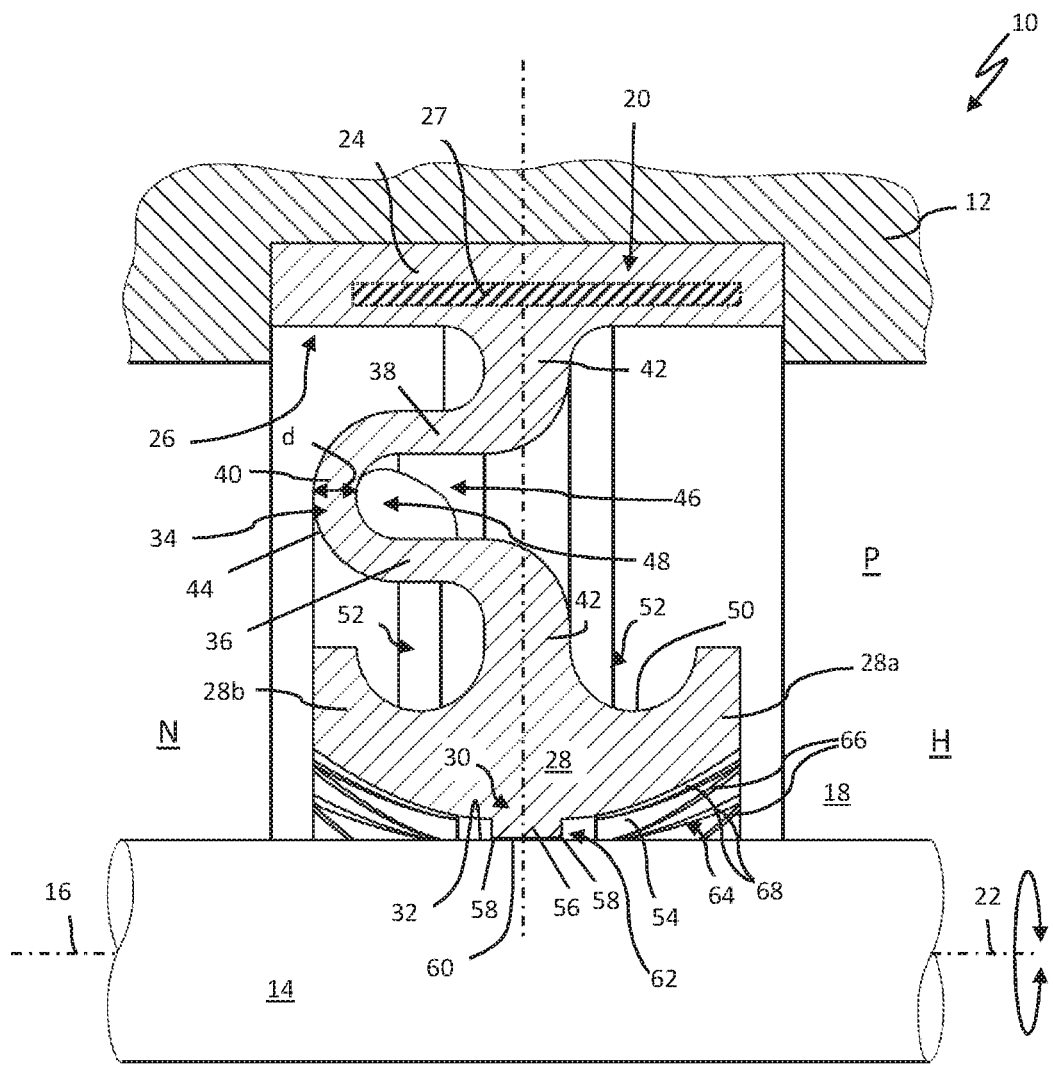
FIG. 1 shows a seal arrangement with two machine parts movable relative to one another about a movement axis machine parts, and with a seal element which bears in a dynamically sealing manner against a sealing surface of one of the two machine parts, wherein the seal element has a base section and a sealing head, which are connected with each other by means of an elastically deformable connecting section which, in sections, is bow-shaped (or U-shaped in cross section), and which is provided with multiple material weaknesses in the circumferential direction.
Figure 2:
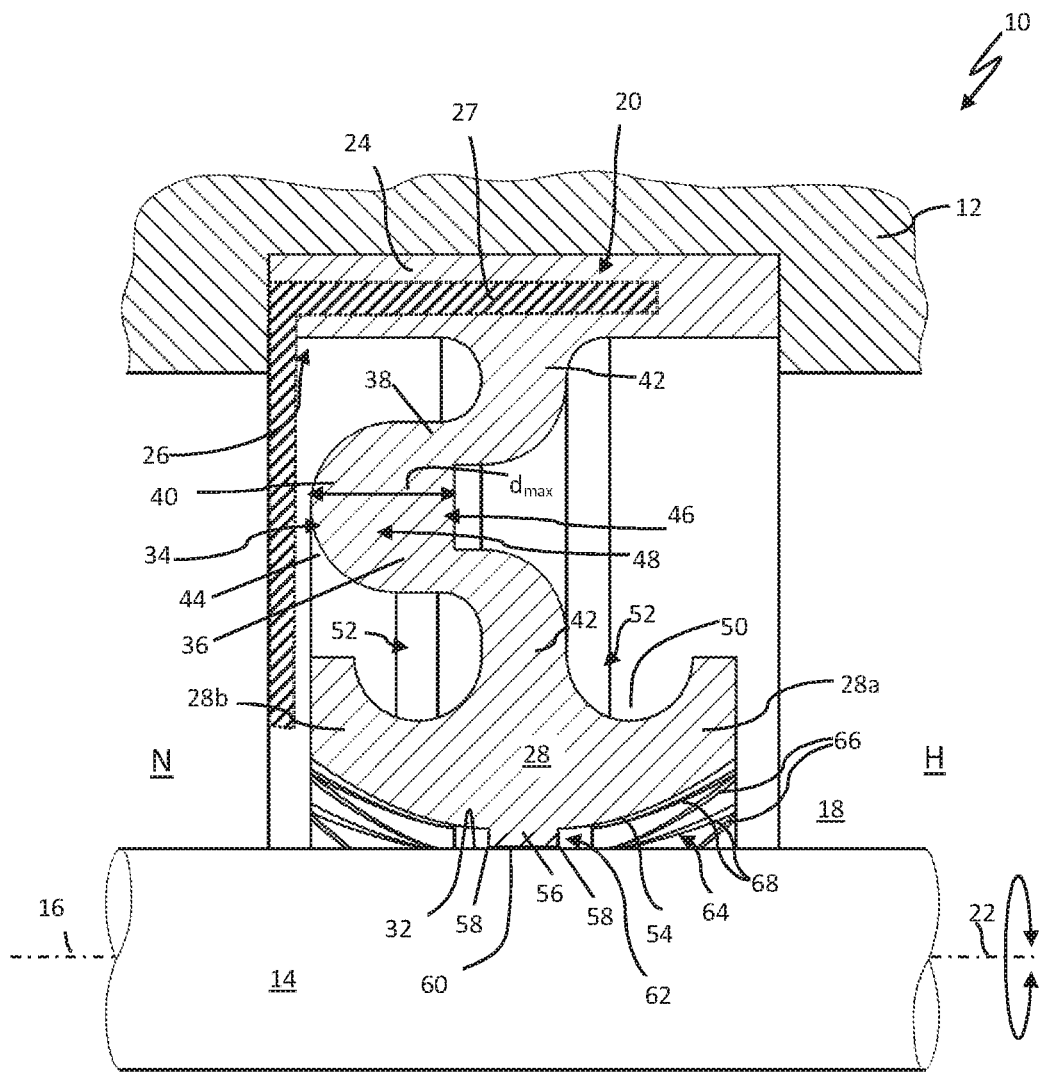
FIG. 2 shows the seal arrangement of FIG. 1 in a different a sectional view, wherein the connecting section of the seal element is shown in a cross section of a non-material-weakened area.

FIGS. 1 and 2 show a seal arrangement 10 having a first and a second machine part 12, 14, which are movable relative to one another about a movement axis designated with 16, here in a rotatable manner. A sealing gap 18 is formed between the two machine parts 12, 14. The sealing gap has a high-pressure side H to be sealed in which a fluid, in particular, a lubricant, such as, for example, oil is arranged and which may be acted upon by a pressure P. The high-pressure side H is sealed by means of a seal element 20 against a low-pressure side N of the sealing gap. The seal element 20 is designed here as a so-called radial shaft ring.

The overall seal element 20 may consist of elastically deformable material, preferably an elastomer, and is preferably made in one piece. The central axis of the seal element 20 is designated with 22. The central axis of the seal element coincides here with the movement axis 16 of the two machine parts 12, 14. A base section 24 of the seal element 20 is held on a seal holding structure, here a holding groove 26, of the first machine part 12. The groove can also be designed in the axial direction to be open at one end. The base section 22 may rest on the first machine part 12 in the radial and/or axial direction to create a static seal. The base section 24 is in this case kept clamped in the seal holding structure. The base section 24 may also be fastened to, for example, pinned, glued, or pressed, to the machine part 12, 14 having the seal holding structure in other ways known to a person skilled in the art. It is understood that supporting or reinforcing parts 27 may be partially or completely embedded into the material of the seal element 20. By means of such reinforcing parts, the seal element 20 may, for example, be held in a seal holding structure formed as an axial unilaterally open holding groove 26 in a press fit. Such a support member as shown in FIG. 2 may also be L-shaped so as to fasten the seal element 20 without a holding groove 26 to the seal holding structure of the first machine part 12. Such a support member may advantageously serve as a stop for the seal element 20 on the low-pressure side.

Figure 5:
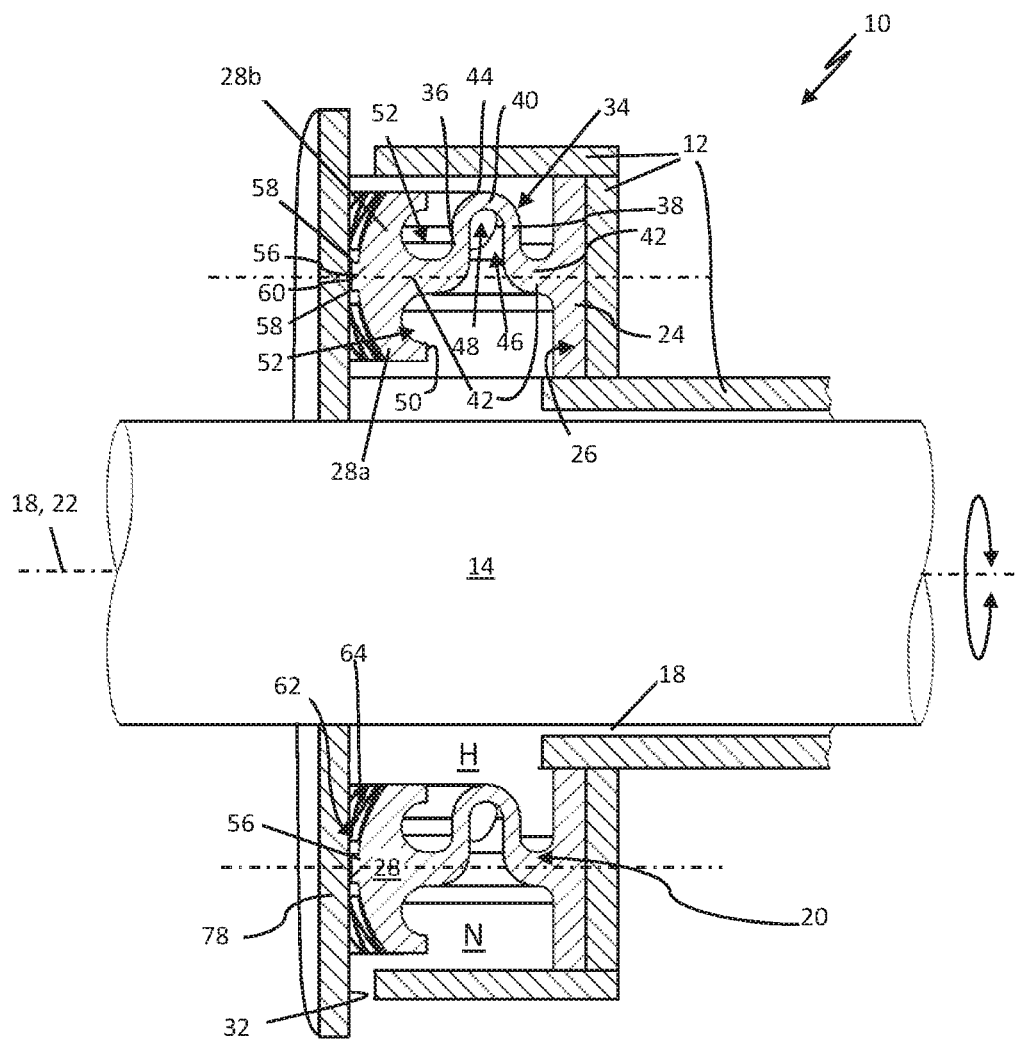
FIG. 5 shows a seal arrangement similar to the seal arrangement according to FIG. 1, in which the seal element is designed to be dynamically sealing in the axial direction in relation to the movement axis of the two machine parts.

The seal element 20 also has a sealing head 28 which comes in contact with a sealing section 30 on a sealing surface 32 of the second machine part 14 in a circumferential dynamically sealing manner. It should be noted that the seal element 20 formed as a radial shaft seal according to FIG. 1 may have a design that seals either on the inside or the outside. The sealing head is located and seals in a direction radial to the movement axis on the sealing surface 32 of the second machine part 14. Of course, the seal element 20 may also be formed so that it seals axially with respect to the movement axis 16 of the two machine parts 12, 14, as explained in more detail below in connection with FIG. 5.

By way of example, the sealing head 28 and the base section 24 are connected to one another here by means of a rubber-elastically deformable connecting section 34. The connecting section 34 is meandering or bow-shaped and thus has, in some sections, a U-shaped cross-sectional shape. A first and second leg 36, 38 of the connecting section each extend parallel or substantially parallel to the sealing surface 32 and are connected to each other by means of a back section 40 of the connecting section 34. The two legs 36, 38 each have an angled end piece 42 which extends here in a direction radial to the movement axis, i.e., in a direction orthogonal to the sealing surface 32, and which is formed on the base portion 24 or the sealing head 28. The back section 40 may have a convex outer side 44 facing the low-pressure side. In the case of the radially sealing seal element 20 shown here, the connecting section 34 thus has a nonlinear cross-sectional profile in a direction radial to the movement axis 16. In the case of an axially sealing seal element, the connecting section accordingly has a nonlinear cross-sectional profile in the axial direction. The connecting section 34 may at least partially or, as is the case here, exclusively cause the prestressed sealing contact of the sealing head 28 on the sealing surface 32. The sealing head 28 is thus preloaded in the illustrated embodiment solely by the material of the connecting section 34 internal elastic resilience against the sealing surface 32. By means of the membrane-like connecting section 34, the sealing head 28 is mounted in a floating radial direction to the movement axis. As a result, the seal element 20 can compensate for an eccentricity of the second machine part 14 without causing any local overstressing of the sealing section 30. It should be noted that an annular space 46 is formed due to the bow-shaped or meander-shaped connecting section between the legs of the connecting section 34. A space is understood to mean a spatial volume in which no component of the seal arrangement is arranged. This space 46 circumferentially surrounds the sealing head. The space 46 is physically delimited in a direction orthogonal to the sealing surface 32 solely by the two legs 36, 38 of the connecting section 34 and fluidly connected to the high-pressure side H of the seal arrangement 10. If the high-pressure side H and thus also the space 46 are subjected to a pressure P, then the sealing head can be pressed against the sealing surface 32 in a pressure-proportional manner relative to the pressure P prevailing on the high-pressure side H. The seal element 20 is thus completely pressure-activatable.

The connecting section 34 has a plurality of material-weakened areas 48 which are preferably regularly spaced from each other in the circumferential direction of the seal element 20. In FIG. 1, a cross section of the seal element 20 is shown at the level of such a materially weakened area 48. FIG. 2 shows the seal element 20 in another sectional plane in which no materially weakened area 48 of the connecting section 34 is intersected. According to FIG. 1, the materially weakened areas 48 can be arranged at the level of the back section 40 (here in the radial direction) or offset relative to the seal holding structure or the sealing surface 32.

In the materially weakened areas, the connecting section 34 consistently has a thickness d which is less than 90%, preferably less than 50%, of the maximum thickness $d_{max}$ of the connecting section 34 in its non-weakened areas. It should be noted that the connecting section 34 is free from recessed passages (through bores) or the like. The connecting section 34 is therefore generally fluid impermeable.

According to FIGS. 1 and 2, the connecting section 34 is mounted at the center of the sealing head 28. Therefore, the sealing head 28 has one side of the head 28a arranged on the high-pressure side and one side of the head 28b arranged on the low-pressure side. The sealing head 28 also has a holding structure on its back side 50 facing the base section 24 on both sides of the connection section 34, i.e., on the low-pressure side and the high-pressure side. The holding structure may be formed as a circumferential annular groove 52 which serves to accommodate other possible attachments, which will be discussed in detail below.

The sealing head 28 has an overall spherical cross-sectional shape with a face 54, which is convexly shaped here. The sealing section 30 comprises an annular tread 56 here. The tread 56 extends away from the end face 54 of the sealing head 28 in the direction of the sealing surface 32. The tread may have a rectangular cross-sectional shape with two sealing edges 58 as shown in FIGS. 1 and 2. It should be noted that the tread has a continuous annular running surface 60 which bears against the sealing surface 32. The sealing surface 60 is preferably formed in a macroscopically unstructured manner.

For an active cooling, lubrication, and flushing of the sealing zone 62 of the seal arrangement 10, the end face 54 of the seal element is provided with a profile system 64 on the high-pressure side. The profile system here comprises a plurality of first and second flow elements 66, 68. These first and second flow elements 64, 66 cause a fluid movement on the high-pressure side H of the sealing gap 18 during a relative movement of the two machine parts about the movement axis 16, which causes fluid to flow onto the sealing head 28 on the high-pressure side in the area of the sealing zone 62.

Figure 3:
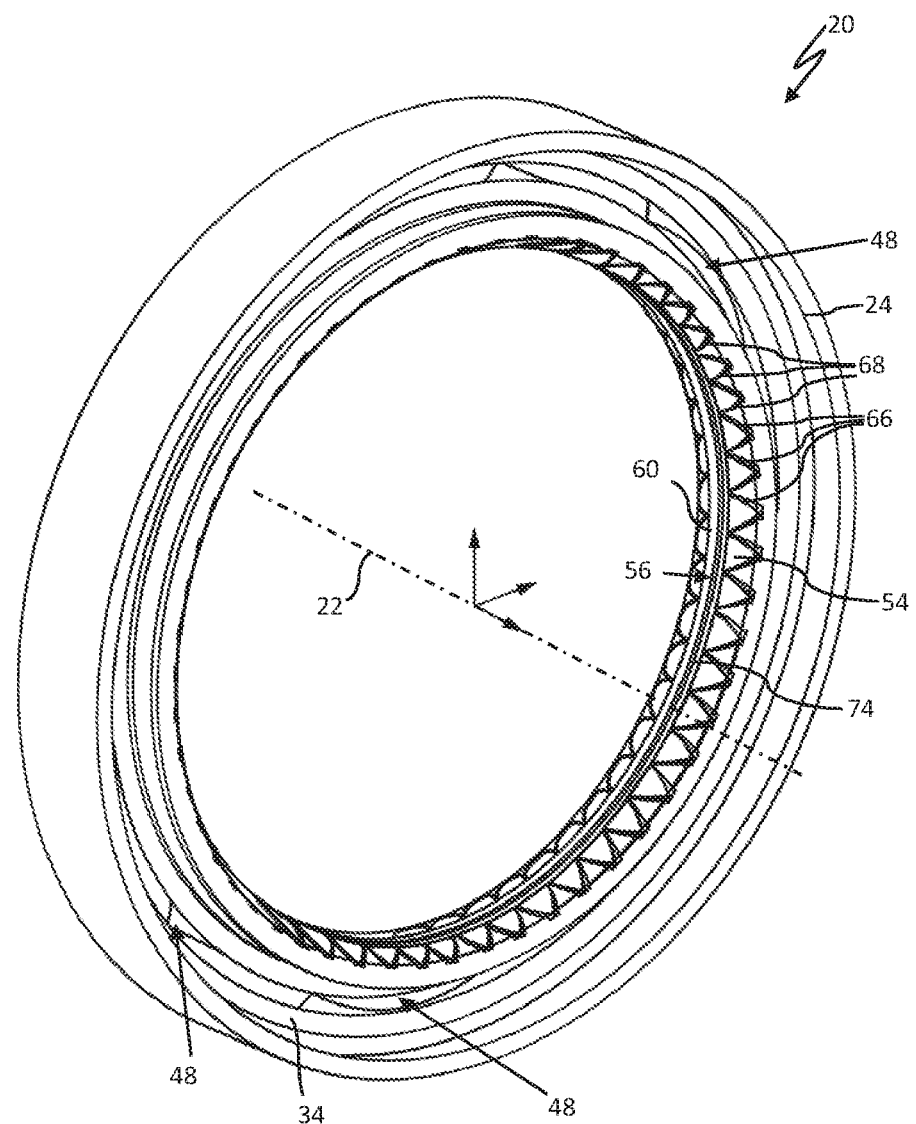
FIG. 3 shows the seal element of the seal arrangement of FIG. 1 in an isolated perspective view showing groove-like flow elements by means of which, when the sealing head is in operation, a flow toward the sealing section of the sealing head is created.
Figure 4:
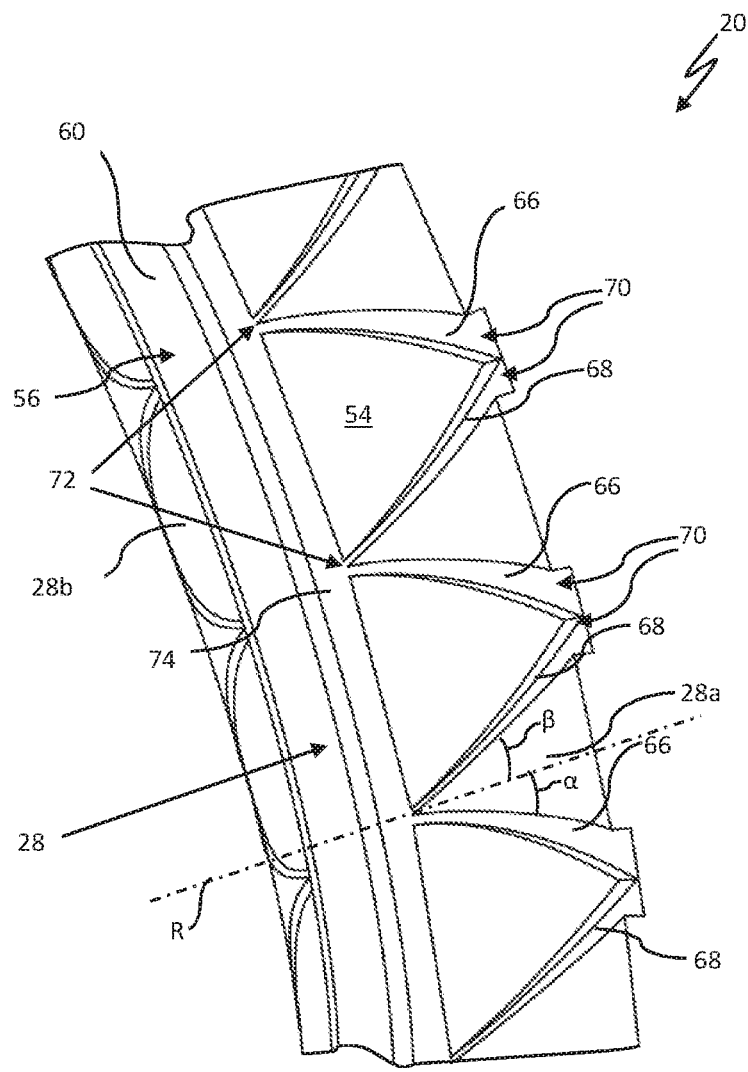
FIG. 4 shows a detail of the seal element according to FIG. 3.

FIG. 3 shows the seal element of the seal arrangement according to FIGS. 1 and 2 in an exposed view. FIG. 4 shows a detail of the seal element 20. The first and second flow elements 66, 68 are each formed here for example as a tread groove or groove of the sealing head 28. The first flow elements 66 are consecutively arranged here spaced from each other on the sealing head 28, for example in the circumferential direction of the seal element 20. The first flow elements 66 are each arranged toward a first side in an inclined manner relative to the (local) radial direction R of the respective first flow element. The first flow elements each include here with the (local) radial direction an angle α of approximately 20°. The second flow elements 68 are also consecutively arranged spaced apart from each other in the circumferential direction of the seal element 20 on the sealing head 28. The second flow elements 68 are in this case each arranged to extend toward a second side in an inclined manner relative to the (local) radial direction R of the respective second flow element 68. The second flow elements 68 each form an angle β with the (locally) radial direction, in this case of approximately 20°. The aforementioned angles α and β can be between 15° and 45°, in particular between 20° and 40°. It is understood that the first flow elements 66 may be arranged at least partially with different angles α to the local radial direction R in an inclined manner. The same applies to the second flow elements 68.

The first and second groove-shaped flow elements 66, 68 each have an opening 70 on the high-pressure side and a second opening 72 facing the low-pressure side. The groove-shaped first and second flow elements 66, 68 each extend here in a direction axial to the movement axis 16 (FIGS. 1 and 2) in the direction of the low-pressure side N or in the direction of the sealing section 30 of the seal element 20, and therefore in the direction of the sealing zone 62. The grooves can open into an annular flow channel in the form of a frontal circumferential groove 74 of the sealing head 28. The frontal circumferential groove 74 is here physically limited toward the low-pressure side N by the tread 56. It should be noted that the end face 54 of the sealing head is arranged spaced apart from the sealing surface 32 in the area in which it has the first and second flow elements 64, 66.

The groove-shaped first and second flow elements 66, 68 may taper in their cross section through which the fluid can flow in the direction of the sealing section 30 of the sealing head 28. This cross-sectional tapering can be achieved by reducing the respective width and/or the respective depth of the grooves along their course in the direction of the sealing section 30 of the sealing head 28.

In the operation of the seal arrangement 10, either the seal element 20 rotates with the seal holding structure having the machine part 12, 14 relative to the sealing surface 32, or the machine part 12, 14 having the sealing surface 32 rotates relative to the seal element 20. In the first case, the fluid is conveyed to the sealing zone 62 and thus to the sealing section 30, depending on the direction of rotation, in the axial direction via the first or second groove-shaped flow elements 66, 68. In the second case, the fluid is offset by its friction on the sealing surface 32 and its inherent viscosity in a flow direction around the movement axis 16 (Taylor-Couette flow).

The fluid thus flows onto the first/second flow elements 66, 68 during a relative movement of the two machine parts 12, 14 around the movement axis 16, and said flow elements generate a flow in the fluid in which the illustrated radially sealing seal element moves in the axial direction—in relation to the movement axis—toward the sealing section 30 of the sealing head 28. The fluid flowing onto the sealing section 30 or the flushing of the sealing zone 62 leads to an improved lubrication, cooling, and cleaning of the sealing zone 62. As a result, the formation and buildup of carbon or the deposition of carbon in the sealing section 30 of the seal element 20 can be counteracted. Carbon already formed and possibly deposited on the sealing section 30 of the seal element can be flushed away by the fluid.

On the low-pressure side N, the sealing head may have return conveying profiles 76, by means of which the drag-back capability of the seal arrangement 10 may be achieved and, by means of which, additional lubrication of the sealing section 30 of the sealing head 28 that is applied to the sealing surface 32 may be achieved from the low-pressure side N as well. The return conveying profiles 76 may be formed here in a manner corresponding to the first and second flow elements 66, 68 arranged on the high-pressure side H of the seal element 20.

According to an alternative embodiment of the seal arrangement 10, said arrangement is provided with an axially sealing seal element 20, i.e., an axial shaft seal. In this case, the sealing surface 32 shown in FIG. 5 may have an annular disk shape and be formed for example by an annular collar 78 of the second machine part 14. The annular collar 78 may be integrally formed, welded, or glued to the second machine part 14.

When the seal arrangement 10 is designed in such a manner, the sealing section 30 of the sealing head 28 comes in preloaded sealing contact with the sealing surface 32 in a direction axial to the movement axis 16. The connecting section thus extends in an axial direction from the sealing head 28 to the base section 24 of the seal element 20 and has a nonlinear cross-sectional profile in the axial direction. The first and second flow elements 66, 68 are arranged on the high-pressure side of the sealing head 28.

Figure 6:
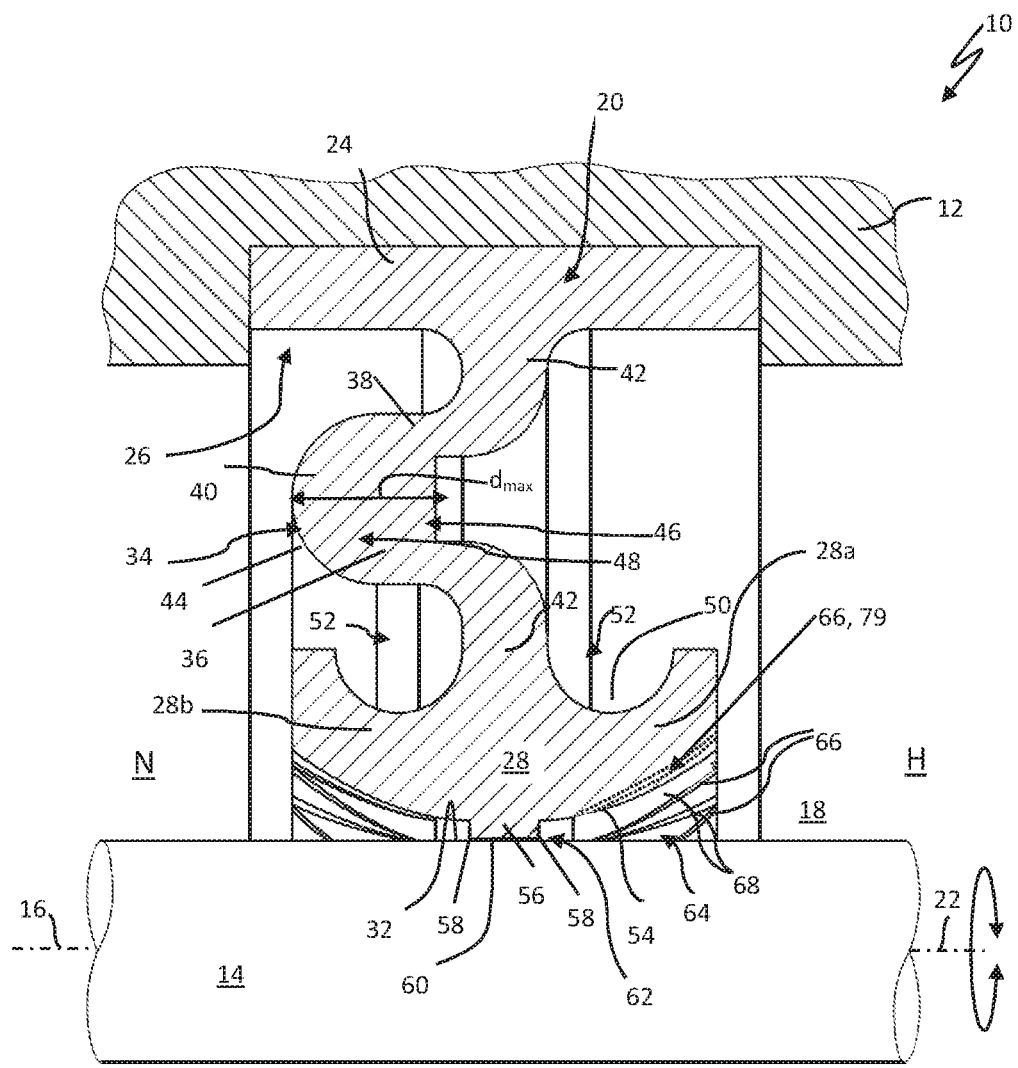
FIG. 6 shows a seal arrangement in which the flow elements are partially designed as a recessed passage (through-bore) of the sealing head.

The first and/or the second flow elements 66, 68 of the sealing head 28 of the seal arrangement 10 explained above may also be formed, at least in sections, as recessed passages (through bores) 79 of the sealing head 28, as shown in the embodiment shown in FIG. 6 with a dashed line.

Figure 7:
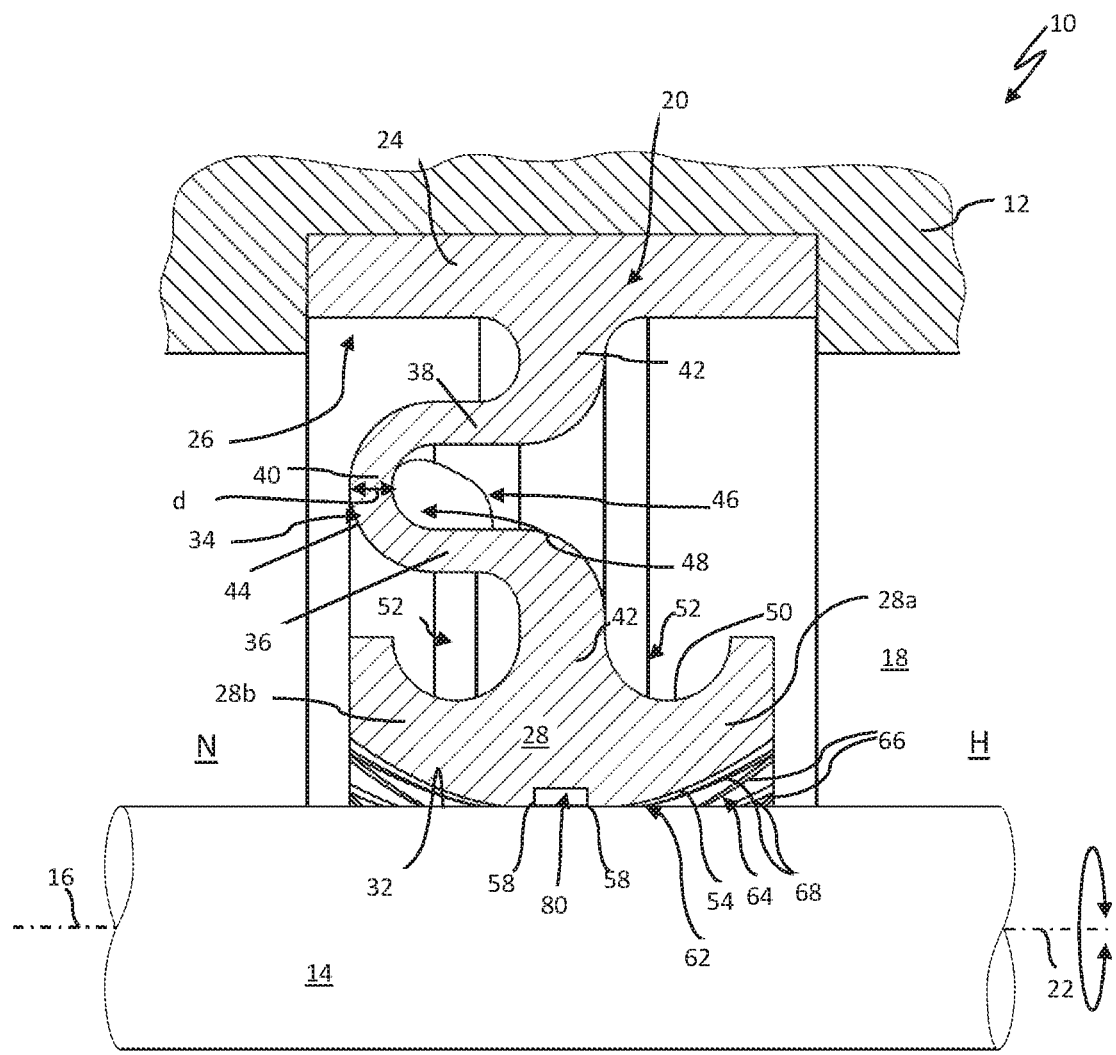
FIG. 7 shows a seal arrangement in which the sealing section of the sealing head of the seal element is provided with a running groove.

According to an alternative development, the seal element 10 may comprise, in the area of its sealing section 30, at least one annular groove or profile groove 80 or a plurality of parallel annular profile grooves 80 instead of the tread shown in FIG. 7. As a result, a sharp-edged or, if required, a rounded sealing edge can be realized on the sealing head on both sides of the profile groove 80. The groove or profile groove 80 represents a depression of the end face 54 of the sealing head. The groove flanks of the profile groove 80, which are not illustrated in greater detail in FIG. 7, are connected to the end face (or its surface) by means of sealing edges 58.

Figure 8:
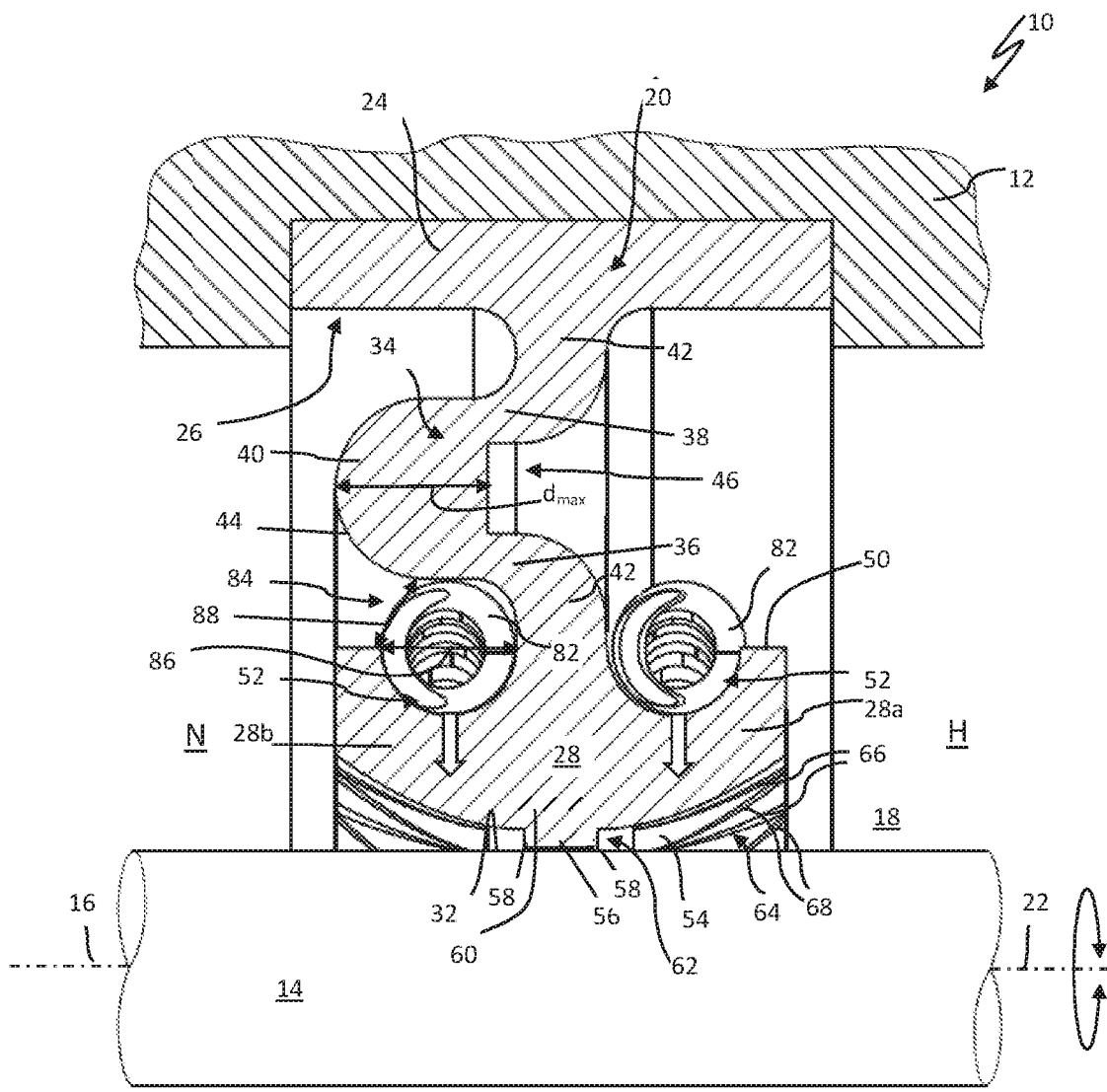
FIG. 8 shows a view similar to the seal arrangement of FIG. 1 in which the sealing head is partially or solely preloaded against the sealing surface by preloading elements designed as worm springs.

FIG. 8 shows a seal arrangement 10 in which the sealing head 28 is pressed against the sealing surface 32 of the second machine part 14 by means of two elastically deformable preloading elements 82. This initial load may be superimposed on the preloading function of the connection section 34 described above or may completely replace such a preloading function of the connecting section 34. The two preloading elements 82 are each formed as components that are separate from the seal element 20 and are arranged on both sides of the connecting section 34, i.e., the low-pressure side and high-pressure side, where they are held in one of the rear annular grooves 52 of the sealing head 28. For this purpose, the annular grooves 52 can each have an opening 84 with an opening width 88 than is smaller than that of the inner diameter 86 of the respective annular groove 52. The preloading elements 82 are thus pressed against the seal element 20 during the operation of the seal arrangement 10. The preloading elements 82 may be formed according to FIG. 8, particularly in the form of a worm spring. Due to the different torque capacities of the connecting section 34 in the circumferential direction of the seal element in its materially weakened areas 48 and its non-materially weakened areas, a contact pressure curve of the sealing section 30 is achieved at the sealing surface 32 of the second machine part 14 in the circumferential direction of the seal element 20 during the operation of the seal arrangement 10. This way, the lubrication and thus the service life of the seal element 20 can be improved.

Figure 9:
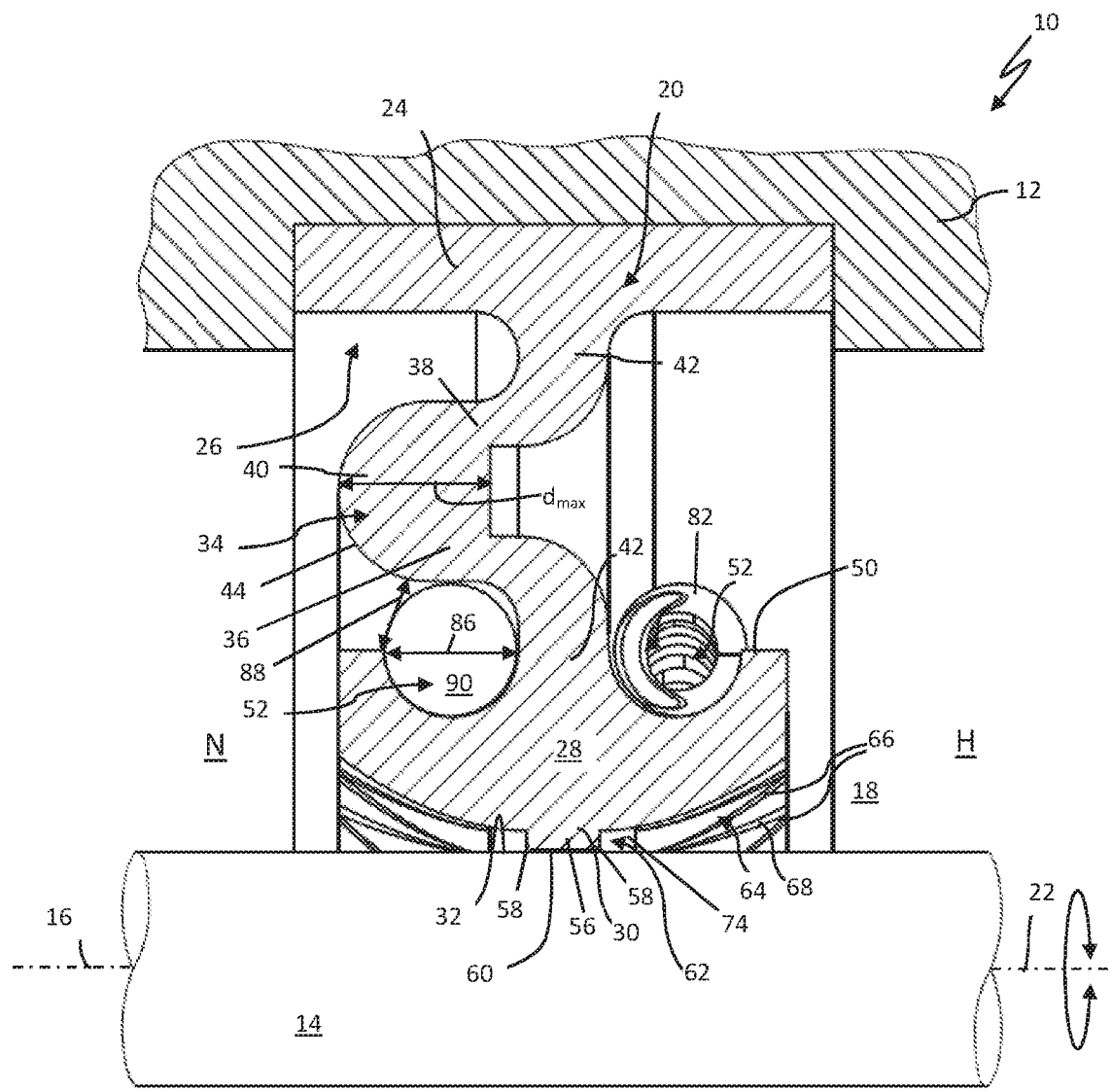
FIG. 9 shows a seal arrangement similar to that of FIG. 8 in which the sealing head of the seal element is held on the high-pressure side by a preloading element designed as a worm spring and on the low-pressure side by a support ring.

FIG. 9 shows a seal arrangement 10 which differs from the exemplary embodiment shown in FIG. 8 essentially in that a support ring 90 is arranged in the annular groove 52 of the sealing head 28 on the low-pressure side. An annular, elastically deformable preloading element 82, here in the form of a worm spring, is arranged in the groove 52 of the sealing head 28 arranged on the high-pressure side.

The support ring 90 is made of a material with a larger elasticity modulus than the elastomer material of the seal element 20. The support ring 90 is dimensionally stable and is not, or is only slightly, deformable by forces occurring during the operation of the seal arrangement 10. By means of the support ring 90, the sealing head 28 of the seal element 20 can be pressed against the sealing surface 32 with a constant or substantially constant contact pressure at the low-pressure side even under pressurization of the high-pressure area H either depending on the variation distance or in its entirety. In other words, the support ring 90 can indirectly act as a preloading element due to the elastic deformability of the seal element 20. When the high-pressure side H is pressurized, the sealing head 28 as well as the connecting section 34 can be supported by the support ring in an axial direction relative to the movement axis 16. In addition, the connecting section 34 may be supported by the support ring 90 in the direction of the sealing surface, i.e., here in a direction radial to the movement axis by its first leg 36 or its back section 40. In this way, a tilting torque, which acts on the connecting section on the sealing head, and thus an undesirable tilting of the sealing head 28 relative to the movement axis 16 can be counteracted. This way, an undesirable leakage of the fluid from the high-pressure side H to the low-pressure side N, i.e., an undesirable blowby, can be avoided when the high-pressure side H is pressurized.

The profile system 64 of the seal element 20 of the seal arrangements explained above may also have one or more flow elements on the high-pressure side, which each extend away from the sealing head 28 in the form of a profile projection. Such flow elements may alternatively or additionally be arranged on the sealing head 28. These flow elements are preferably arranged on the end face 54 of the sealing head 28 pointing toward the sealing surface 32 and/or on a side edge of the sealing head, as explained in more detail below in connection with FIGS. 11 to 14.

Figure 10:
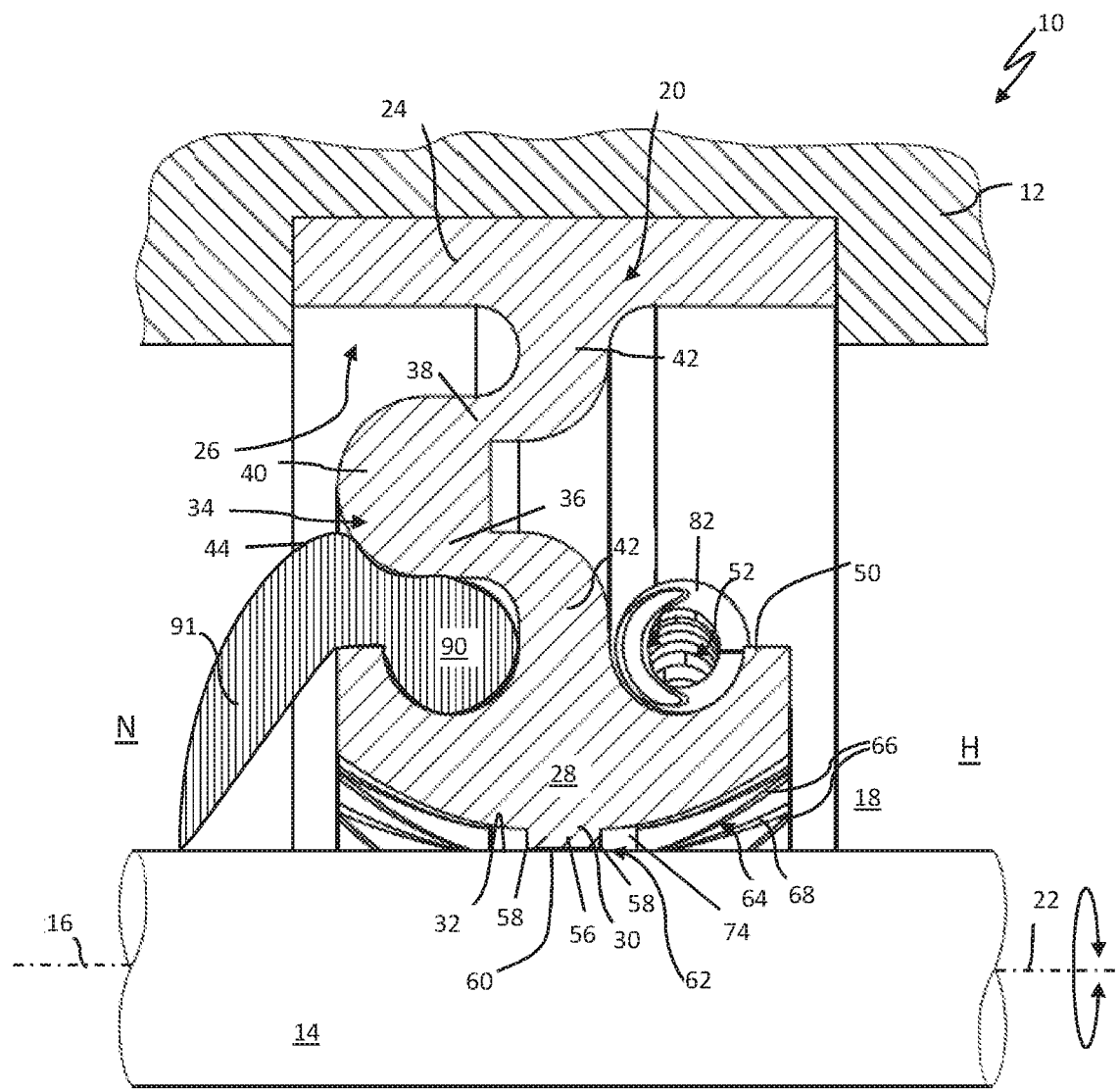
FIG. 10 shows a seal arrangement similar to that of FIG. 9, wherein the support ring of the seal element arranged on the low-pressure side additionally comprises a wiping or sealing lip which circumferentially abuts the sealing surface.

According to the seal arrangement 10 shown in FIG. 10, the support ring 90 may be provided with an (annular) sealing or wiping lip 91 which rests circumferentially on the sealing surface 32 of the second machine part.

Figure 11:
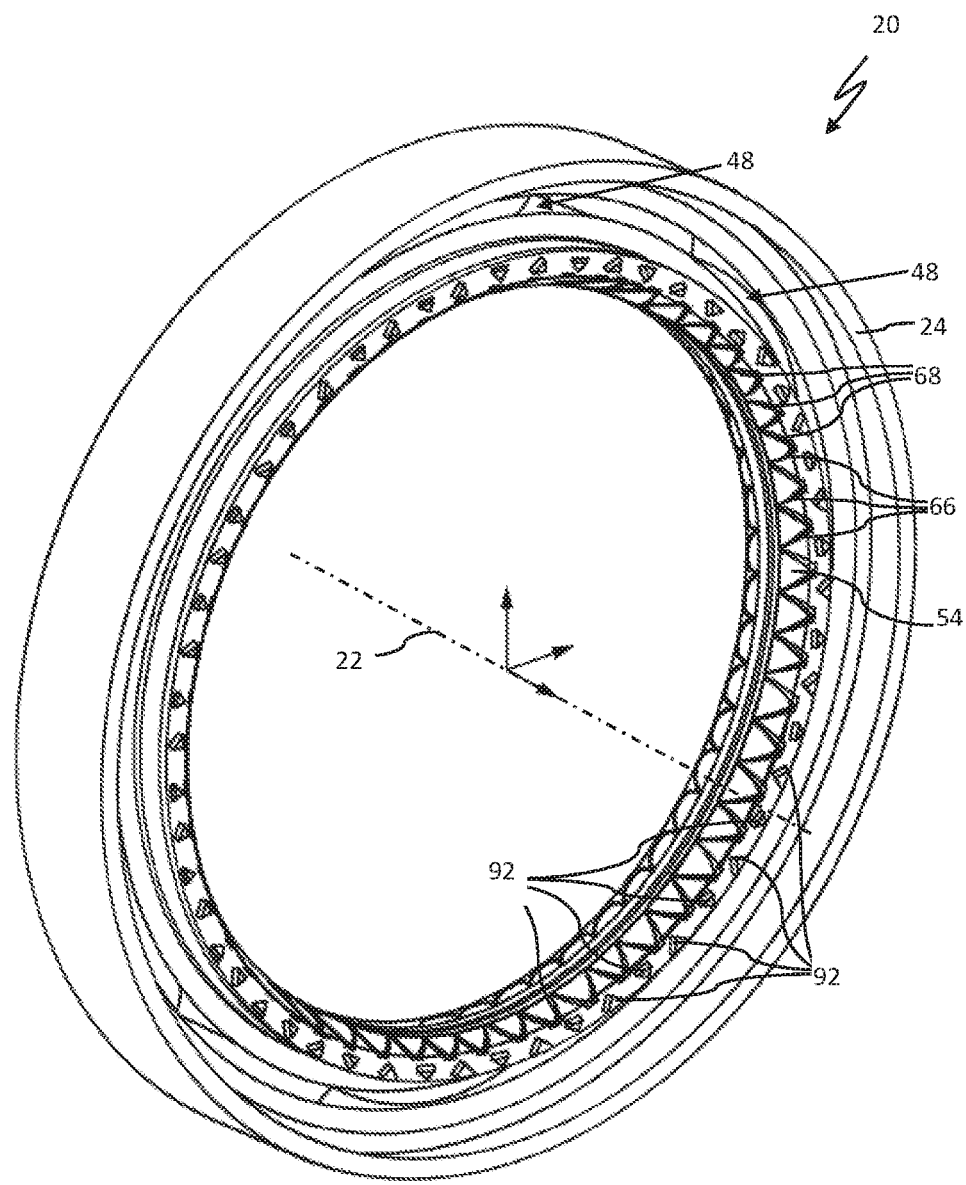
FIG. 11 shows an alternative embodiment of a seal element which has flow elements that are groove-shaped or that are formed as profile extensions in an isolated perspective view.
Figure 12:
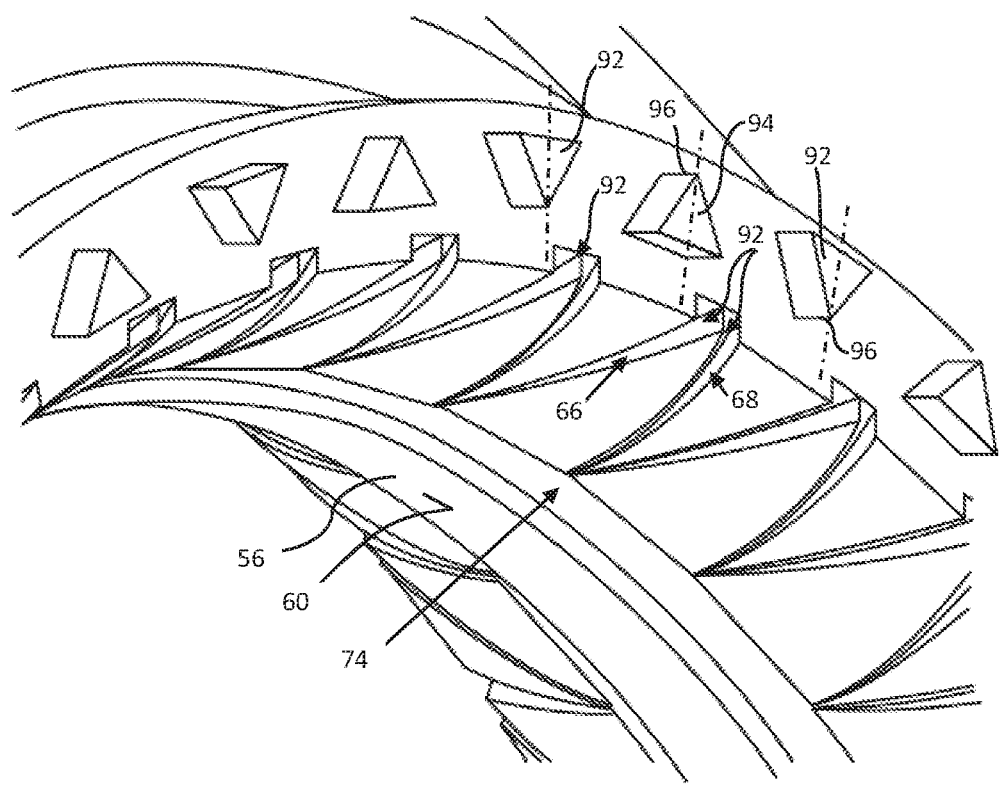
FIG. 12 shows the seal element according to FIG. 1 in a partial detail view.

The seal element 20 shown in FIGS. 11 and 12 has third and fourth flow elements 92, 94 in addition to the first and second flow elements 66, 68 described above. These flow elements 92, 94 each have a triangular basic or cross-sectional shape. The third flow elements point with their tip 96 in the direction of the central axis 22 of the seal element 20, while the tip 96 of the fourth flow elements faces away from the central axis 22.

The third and fourth flow elements 92, 94 are consecutively and alternatingly arranged one behind the other in the circumferential direction of the seal element 20. It is a matter of course that the flow elements 92, 94 may also be arranged on the sealing head in groups in either one row or in several rows.

The third and fourth flow elements 92, 94 formed as a profile projections form—analogous to the side flanks of the groove-shaped first and second flow elements 66, 68, flow surfaces 96 for the fluid by means of which the fluid—depending on the direction of rotation—can be moved along the sealing gap 18 toward the sealing zone 62 (FIG. 1) of the seal arrangement 10 and/or away from the sealing zone 62. In terms of their shape, size, and spatial distribution pattern on the seal member 20, the profile projections may be aligned with the position and spatial distribution pattern of the high-pressure side openings of the groove-shaped first and second flow members 66, 68 of the seal head 28 to produce a sufficiently large volume flow of the fluid per unit time to the sealing section or the sealing zone 62 when the seal arrangement 10 is in operation.

Figure 13:
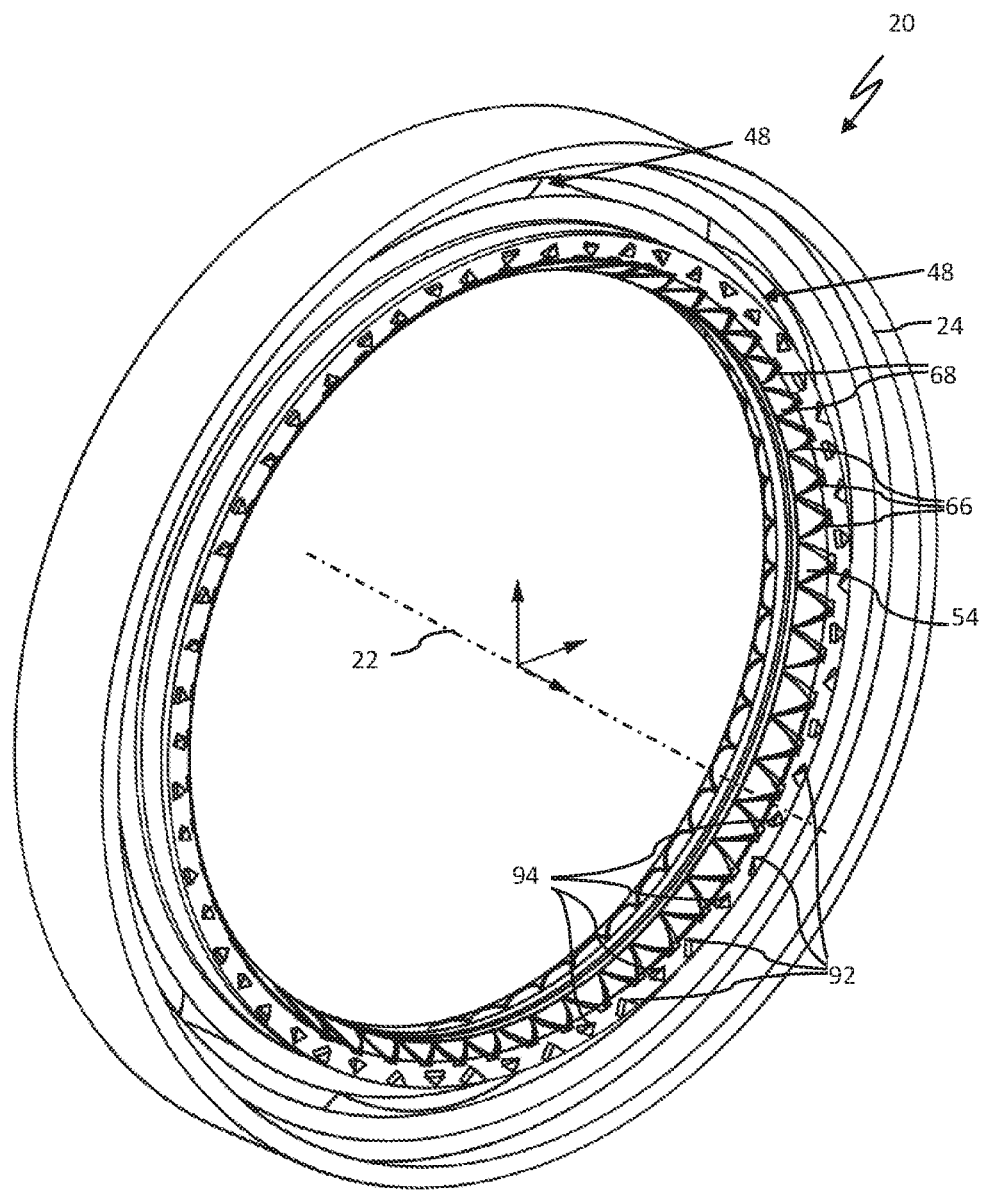
FIG. 13 shows a seal element that is similar to that of FIGS. 11 and 12 in which the flow elements formed like profile extensions are designed in a tetrahedral manner.
Figure 14:
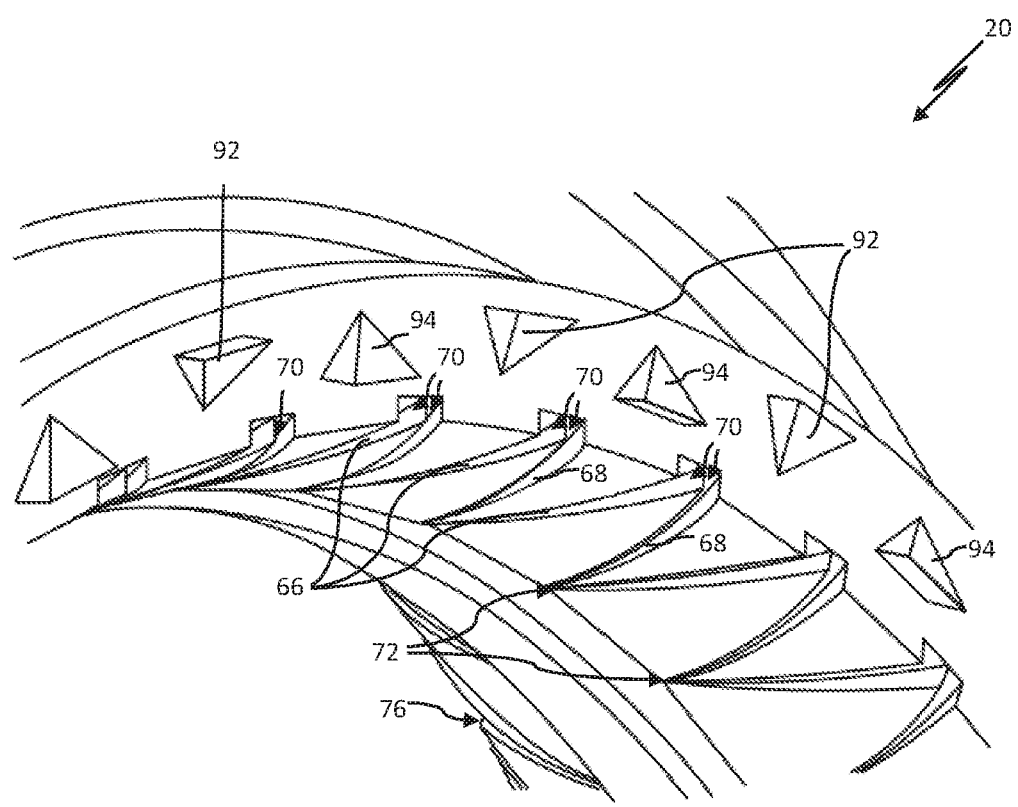
FIG. 14 shows the seal element of FIG. 13 in a partial detail view.
Figure 15:
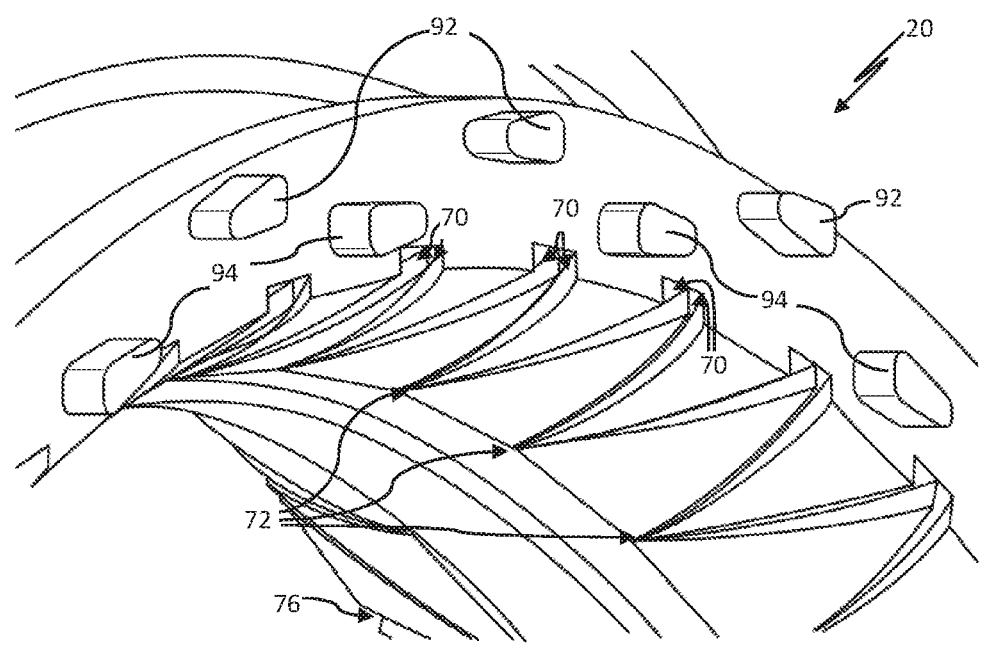
FIG. 15 shows a seal element with trapezoidal flow elements in a partial detail view.
Figure 16:
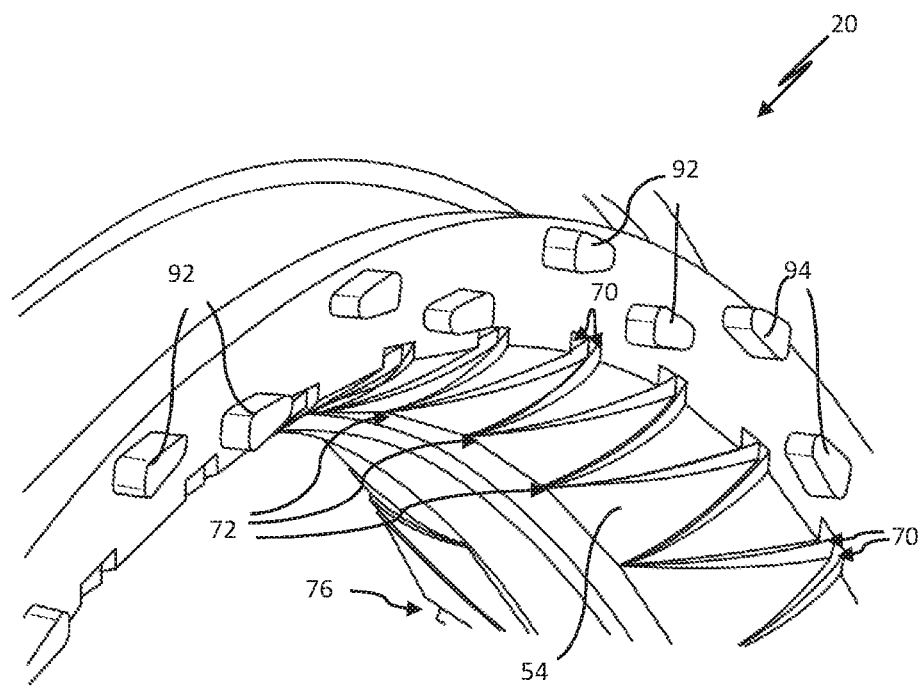
FIG. 16 shows a seal element similar to the seal element shown in FIG. 15 in a partial detail view.

According to the exemplary embodiment shown in FIGS. 13 and 14, the flow elements 92, 94 formed as a profile projection may also have a rhomboid shape, and the exemplary embodiments shown in FIGS. 15 and 16 may have a trapezoidal or approximately trapezoidal shape.

Figure 17:
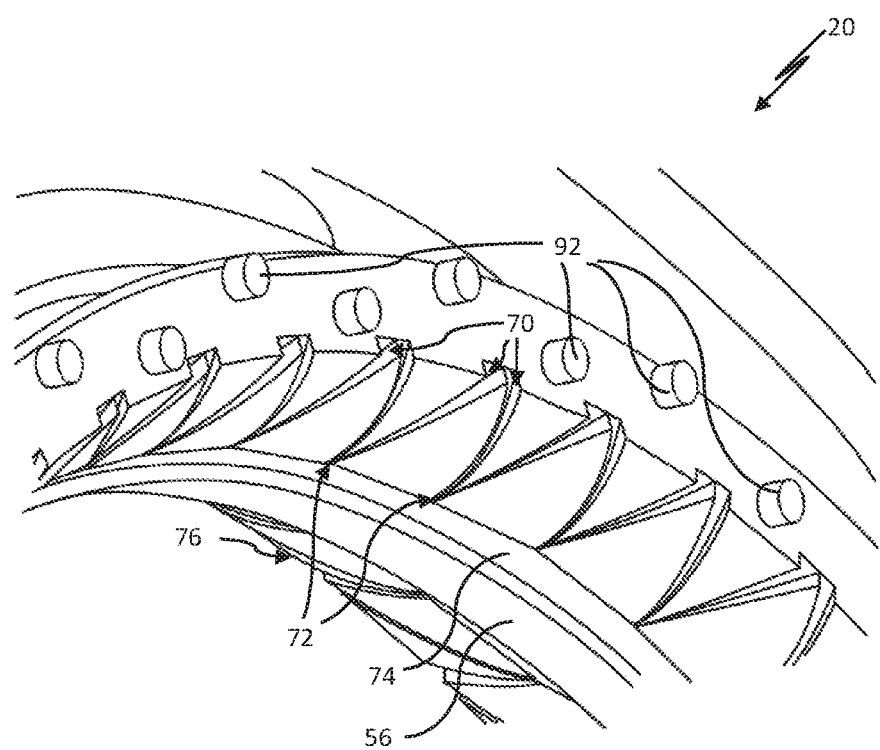
FIG. 17 shows a seal element with cylindrical second flow elements in a partial detail view.

In the embodiment shown in FIG. 17, the flow elements 92, 94 formed as profile projections have a circular cylindrical basic shape and consequently a circular cross-sectional shape. These third flow elements 92 are arranged in two rows and relative to each other in gaps in the circumferential direction of the seal element 20 so that, regardless of the circular cross-sectional shape of the flow elements 92, 94, a directed fluid flow along the sealing gap 18 (FIG. 1) can be generated.

In operation, the fluid arranged on the high-pressure side H can be effectively mixed by the flow elements 92, 94 formed as profile projections, and turbulences can be generated in the fluid through which the particulate impurities contained in the fluid are further crushed and slurried. In this way, a damaging effect of the particles on the sealing surface or the seal element 20 can be further reduced.

What is claimed is:

1. A seal arrangement comprising:
a first and a second machine part which are arranged spaced apart from one another with the formation of a sealing gap and can be moved relative to one another about a movement axis;
a seal element with a base section which is held by a seal holding structure of one of the two machine parts; and
the seal element having a sealing head, the sealing head having an end face convexly formed in cross section and formed spherically on a sealing surface side;
the sealing head having a sealing section, wherein the sealing section abuts in a dynamically sealing manner against a sealing surface of the respective other machine part in order to seal a high-pressure side H of the sealing gap with respect to a low-pressure side N, wherein the high-pressure side having a fluid in the form of a lubricant;
wherein the end face of the sealing head does not abut against the sealing surface of the respective other machine part and defines a high-pressure side fluid space between the end face and the sealing surface, which high-pressure side fluid space tapers moving towards the sealing section of the seal arrangement in a cross-section;
wherein the sealing head and the base section are connected with each other by an elastically deformable connecting section of the seal element;
wherein the sealing section is an annular tread which extends away from the sealing head and towards the sealing surface of the respective other machine part, wherein the annular tread has a continuous running surface;
wherein the seal element is provided on the high-pressure side of the convexly formed end face with at least one flow element in the form of either:
a groove arranged at the end face which is open toward the sealing surface of the respective other machine part, the groove extending in a direction at least partially axial to the movement axis, wherein the groove is fluidly connected with a circumferential groove formed in the end face disposed adjacent to the annular tread of the sealing head; or
a through bore disposed underneath the end face open on both ends, one end of which is fluidly connected with the circumferential groove formed in the end face disposed adjacent to the annular tread of the sealing head;
wherein the groove and the through bore tapers at least in sections in its cross section through which the fluid can flow in the direction of the sealing section of the sealing head, the tapering narrowing in cross section moving towards the circumferential groove;
wherein a fluid flow is brought about in the case of a relative movement of the two machine parts in such a way that the fluid flows toward the sealing head in the area of its sealing section on the high-pressure side.

2. The seal arrangement according to claim 1, wherein the groove is designed to be open at both ends.

3. The seal arrangement according to claim 1, wherein the circumferential groove is delimited laterally directly by the annular tread bearing against the sealing surface of the respective other machine part.

4. The seal arrangement according to claim 1, wherein the flow element is integrally formed on the sealing head.

5. The seal arrangement according to claim 1, wherein the groove of the flow element has an oval, elliptical, circular, triangular, or polygonal cross-sectional shape.

6. The seal arrangement according to claim 1, wherein the groove comprises a plurality of grooves.

7. The seal arrangement according to claim 6, wherein the plurality of grooves in the circumferential direction of the seal element are consecutively arranged on the sealing head in one or more rows.

8. The seal arrangement according to claim 1, wherein the connecting section has, at least in sections, a nonlinear cross-sectional profile.

9. The seal arrangement according to claim 8, wherein the connecting section has a plurality of areas with material weaknesses which are regularly spaced from each other in the circumferential direction of the seal element.

10. The seal arrangement according to claim 9, wherein the connecting section causes a prestressed sealing contact of the sealing head on the sealing surface.

11. The seal arrangement according to claim 1, wherein the sealing head, on a rear side facing the base section, has at least one holding structure, being an annular groove, in which an elastically deformable preloading element, being a worm spring, is arranged to press and hold the sealing head against the sealing surface.

12. The seal arrangement according to claim 1, wherein the sealing head has an annular groove on both sides of the connecting section, wherein:
in both annular grooves an elastically deformable preloading element is arranged; or
in the annular groove arranged on the low-pressure side is a support ring and in the high-pressure side an elastically deformable preloading member is arranged.

13. The seal arrangement according to claim 1, wherein the seal element comprises, at least partially, of a rubber-elastically deformable elastomer material.

14. The seal arrangement according to claim 1, wherein the seal element consists completely of a rubber-elastically deformable elastomer material.

15. The seal arrangement according to claim 6, wherein the plurality of grooves comprise a first plurality of grooves and a second plurality of grooves, the first plurality of grooves consecutively arranged spaced apart from one another on the sealing head, the second plurality of grooves consecutively arranged spaced apart from one another on the sealing head, wherein each groove of the first plurality of grooves are inclined relative to a local radial direction, the local radial direction extending radially from the movement axis, wherein each groove of the second plurality of grooves are inclined opposite to the first plurality of grooves relative to the local radial direction.

\* \* \* \* \*